(No Model.)

J. DWIGANS.
HAY RAKE AND LOADER.

No. 321,489.        Patented July 7, 1885.

WITNESSES

James Dwigans
INVENTOR

Attorneys

UNITED STATES PATENT OFFICE.

JAMES DWIGANS, OF TIPTON, IOWA.

HAY RAKE AND LOADER.

SPECIFICATION forming part of Letters Patent No. 321,489, dated July 7, 1885.

Application filed May 3, 1884. (No model.)

*To all whom it may concern:*

Be it known that I, JAMES DWIGANS, a citizen of the United States, residing at Tipton, in the county of Cedar and State of Iowa, have invented a new and useful Hay Rake and Loader, of which the following is a specification, reference being had to the accompanying drawings.

This invention has relation to hay rakes and loaders combined, which rake the hay from the ground and deliver it to the wagon at one operation; and the invention consists in the construction and novel arrangement of parts, as will be hereinafter fully described, and particularly pointed out in the claim.

Figure 1:
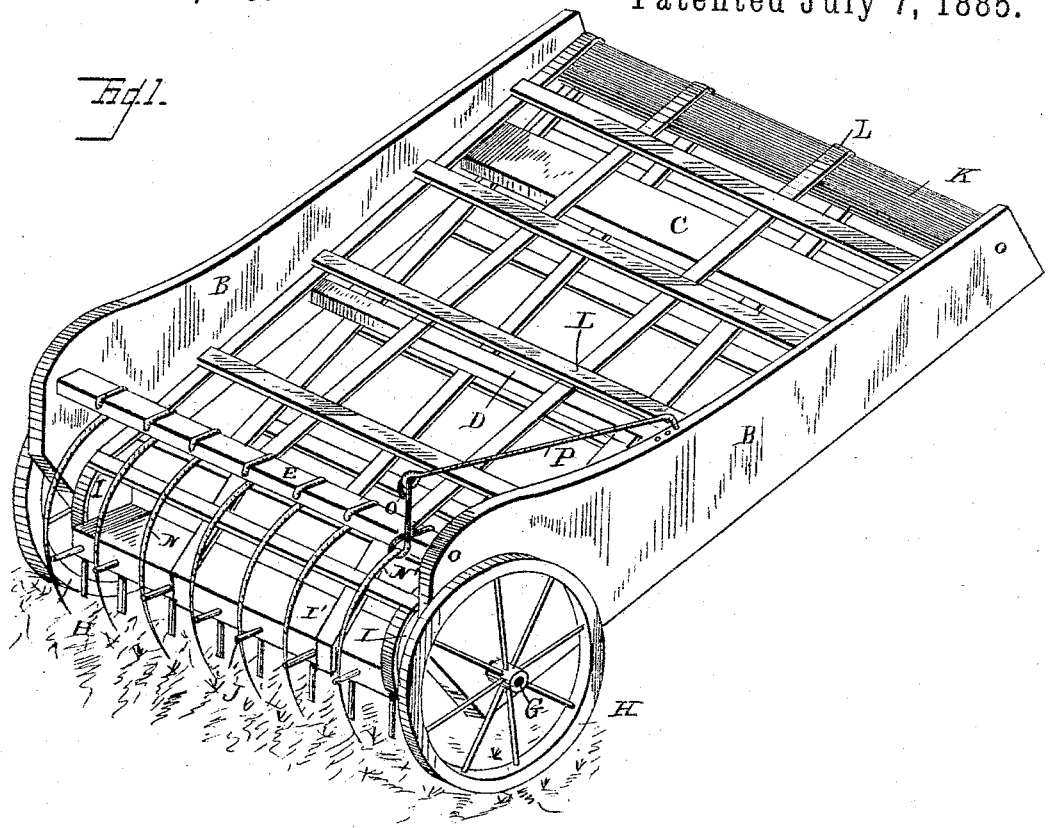
Figure 2:
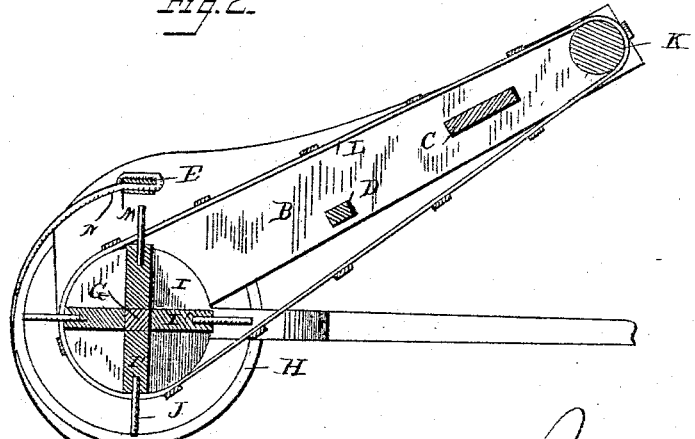

Referring to the accompanying drawings, Figure 1 is a view in perspective of a combined hay rake and loader embodying my improvement, and Fig. 2 is a vertical longitudinal sectional view.

The elevator-frame is composed of the sides B B, which are connected by cross-bars C D. The side bars are enlarged at their lower ends to form the bearings for the rake-head E and the toothed elevator-reel. The shaft G of the elevator-reel projects through the sides B B, and one of the carrying-wheels H H is fixed on the projecting end of the shaft G. Thus when the elevator-frame is attached to the wagon and drawn along the wheels H H revolve, and one of them imparts the necessary motion to the elevator-reel.

The elevator-reel is composed of the circular heads I I, secured to the shaft G, and the radial transverse bars I'—four in number—arranged at right angles to each other between the heads I I, and provided in their outer edges with teeth J. The upper end of the elevator-frame is provided with a roller, K. An endless apron, L, constructed of chains, ropes, or belts and cross-slats, runs over the reel and roller K, to carry the hay to the wagon.

The rake-head E is provided with lateral perforations M, through which the upper ends of the rake-fingers N are passed forward, then bent upward and backward over the rake-head, and then downward and inward against the rear face of the rake-head. All of the rake-fingers are thus constructed, except the finger N', at one end of the rake-head, which is bent as above described and then continued around beneath its rear portion and then up in rear of the rake-head and bent to form an eye, O, at its upper end, with which eye is connected one end of a spring, P, the other end of the spring being bent downward and driven into the upper edge of the side of the elevator-frame, as shown. This spring is to permit the rake-head to have a slight rocking motion in its bearings to relieve the points of the rake-fingers when they meet with an obstruction. The operation of the machine is quite simple. The rake gathers the hay and the teeth of the elevator-reel carry it up the rake-fingers onto the carrier or endless apron, which elevates it and delivers it to the wagon.

Having thus fully described my invention, what I claim as new, and desire to secure by Letters Patent of the United States, is—

The combination, with the elevator-frame, roller, toothed reel, and endless apron, of the rake-head provided with the curved rake-fingers N N', the end finger, N', having a heel extension above the rake-head provided with an eye, O, at its upper end, and the spring P, connected to the eye O and to the elevator-frame, substantially as specified.

In testimony that I claim the foregoing as my own I have hereto affixed my signature in presence of two witnesses.

JAMES DWIGANS.

Witnesses:
W. W. ALDRICH,
J. N. NEIMAN.